(12) United States Patent
Khoshnood

(10) Patent No.: US 6,494,604 B2
(45) Date of Patent: Dec. 17, 2002

(54) BOW SIGHT SYSTEM

(76) Inventor: Bahram Khoshnood, 2735 Two Rock Ct., Alpharetta, GA (US) 30004

( * ) Notice: Subject to any disclaimer, the term of this patent is extended or adjusted under 35 U.S.C. 154(b) by 0 days.

(21) Appl. No.: 09/900,206

(22) Filed: Jul. 5, 2001

(65) Prior Publication Data

US 2001/0048602 A1 Dec. 6, 2001

Related U.S. Application Data

(63) Continuation of application No. 09/480,723, filed on Jan. 7, 2000, now abandoned.

(51) Int. Cl.[7] .............................................. F41G 1/467
(52) U.S. Cl. ........................ 362/577; 362/554; 362/234; 33/265
(58) Field of Search .................... 33/265, 263; 362/555, 362/577, 234, 554

(56) References Cited

U.S. PATENT DOCUMENTS

| | | |
|---|---|---|
| 4,177,572 A | 12/1979 | Hindes |
| 4,220,983 A | 9/1980 | Schroeder |
| 4,535,544 A | 8/1985 | Jones et al. |
| 4,875,144 A | 10/1989 | Wainwright |
| 4,894,921 A * | 1/1990 | Barlow ........................ 33/265 |
| 5,634,278 A | 6/1997 | London |
| 6,000,141 A * | 12/1999 | Afshari ........................ 33/265 |
| 6,073,352 A | 6/2000 | Zykan et al. |

* cited by examiner

Primary Examiner—Stephen Husar
(74) Attorney, Agent, or Firm—Hinkle & O'Bradovich, LLC

(57) ABSTRACT

An electronically lighted sighting device for use in conjunction with an archery bow is disclosed. The sight includes an electronic circuitry with at least one switch, a plurality of LEDs and elongated fiber optic pins, and having one end of each fiber optic pin located in front of an LED and the other end extended and formed to act as an aiming point. A fiber optic pin transmits the light from the associated LED to the other end of the fiber optic pin or filament, the filament tip then acts as the bright aiming point. The electronic circuitry is powered by batteries and is programmed such that by actuating the switch the archer can select each of the LEDs, individually or collectively, for illumination, along with illumination intensity levels.

10 Claims, 3 Drawing Sheets

Fig_1

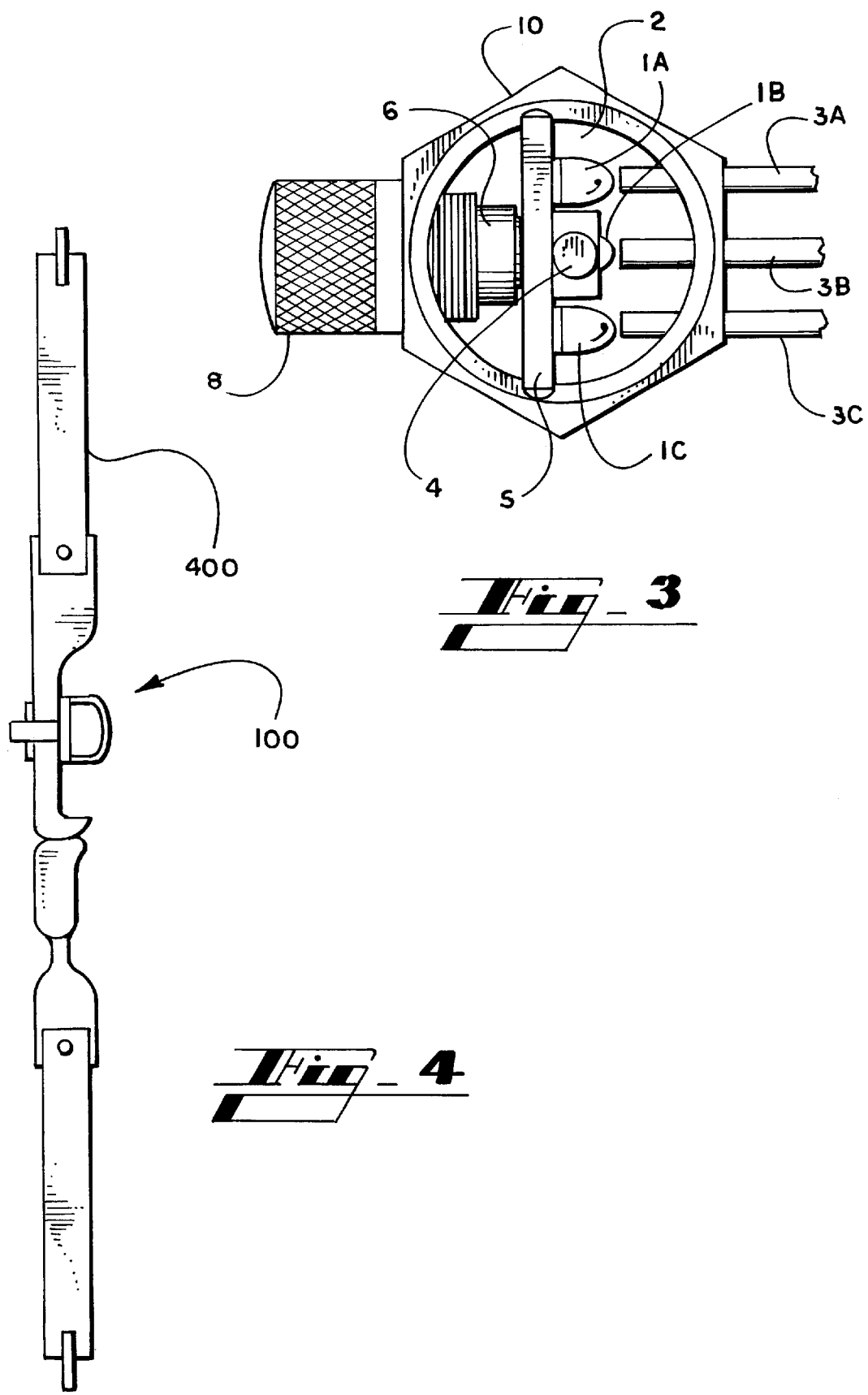

BOW SIGHT SYSTEM

CROSS-REFERENCE TO RELATED APPLICATIONS

This is a continuing patent application of non-provisional patent application, Ser. No. 09/480,723, filed Jan. 7, 2000, entitled, "Selective Illumination of Aiming Pins in a Bow Sight with a Plurality of Pins", now abandoned.

BACKGROUND

I. Field of the Invention

The present invention relates generally to the field of archery and bow sights and more particularly to a bow sight having aiming pins adapted to be selectively illuminated.

II. Description of the Related Art

In bow hunting and archery tournaments, bow sights typically have many aiming pins that can be illuminated to sight targets. Often times when several pins are illuminated the archer can become confused when the pins are equally illuminated.

Such fiber pin illumination systems fail to provide sufficient pin illumination to allow archers to sight targets effectively and not become confused in the process.

SUMMARY OF THE INVENTION

In general the invention features an advanced fiber pin illumination system having intensity level adjustability allowing selective illumination on the aiming pins. The bow sight includes a personal computer (PC) board having programmable electronic circuitry. The PC is located generally on a PC board located in a housing cavity within a windage adjustment bar. The bow sight also includes a plurality of light emitting diodes (LEDs) or other illuminating devices and associated fiber optic pins. The bow sight further includes at lease one battery and a user activated switch with a push button pad covering it, typically elastic material.

In general, in one aspect, the invention features a selective pin illumination system, including a plurality of elongated fiber optic pins having a first end and a second end, a control circuit and a plurality of light emitting elements electrically coupled to the control circuit wherein each of the light emitting elements is optically coupled with a corresponding first end of the elongated fiber optic pin.

In one implementation, the system includes a power source connected to the control circuit.

In another implementation, the control circuit includes a process with instructions to selectively illuminate the light emitting elements, and selectively adjust the intensity of the light emitting elements.

In another implementation, the system includes one or more switches electrically coupled to the control circuit, wherein the one or more switches are adapted to selectively illuminate the light emitting elements and to selectively adjust the intensity of the light emitting elements.

In another implementation, the process further includes instructions to remove power from the control circuit after an extended period of non-use.

In another implementation, the elongated fiber optic pins has an individual color.

In still another implementation, the light emitting elements transmit light to each of the fiber optic pins.

In another aspect, the invention features a bow sight, including a mounting bracket, a windage adjustment bar connected to the mounting bracket, the windage adjustment bar having a cavity, a selective pin illumination system, including a plurality of elongated fiber optic pins having a first end and a second end, the fibers extending from the cavity to a pin holding bracket connected to the windage adjustment bar, a control circuit located within the cavity and a plurality of light emitting elements electrically coupled to the control circuit wherein each of the light emitting elements is optically coupled with a corresponding first end of the elongated fiber optic pin within the cavity.

In an implementation, the bow sight includes a switch electrically coupled to the control circuit, the switch protruding from the cavity.

In another implementation, the bow sight includes an elastic push button cover mechanically coupled to the switch and covering the cavity.

In still another implementation, the bow sight includes at least one battery electrically coupled to the control circuit.

In yet another implementation, the bow sight includes a battery housing cap enclosing the at least one battery and connected to the windage adjustment bar.

In another implementation, the second ends of the plurality of elongated fiber optic pins emit light within the pin holding bracket.

In another implementation, the second ends of the plurality of elongated fiber optic pins are adapted to be adjusted as aiming points.

In another implementation, the bow sight includes a set screw for each of the plurality of elongated fiber optic pins.

In another aspect, the invention features a bow, including a bow shaft, a bow string connected to the bow shaft, a bow sight connected to the bow shaft, the bow sight including a mounting bracket, a windage adjustment bar connected to the mounting bracket, the windage adjustment bar having a cavity, a selective pin illumination system, including a plurality of elongated fiber optic pins having a first end and a second end, the fibers extending from the cavity to a pin holding bracket connected to the windage adjustment bar a control circuit located within the cavity; and a plurality of light emitting elements electrically coupled to the control circuit wherein each of the light emitting elements is optically coupled with a corresponding first end of elongated fiber optic pin within the cavity.

One advantage of the invention is that it provides an archer with the capability of selectively illuminating a desired pin or pins for improving the aim of the bow sight.

Another advantage is that the invention allows an archer to select illumination intensity level of the desired pin(s).

Another advantage is that the power source has a prolonged life because incorporated programming for an automatic shutoff of the illumination system follows a period of non-use.

Another advantage of the system is that makes use of advanced electronic circuitry and control to maximize the efficiency of the illumination system as compared to conventional low efficiency light systems.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 3 is a front view of an embodiment of a PC board housing cavity;

FIG. 4 illustrates a front view of a bow having the bow sight of FIGS. 1–3.

DETAILED DESCRIPTION OF THE INVENTION

Bow Sight Apparatus and Illumination System

Figure 1:
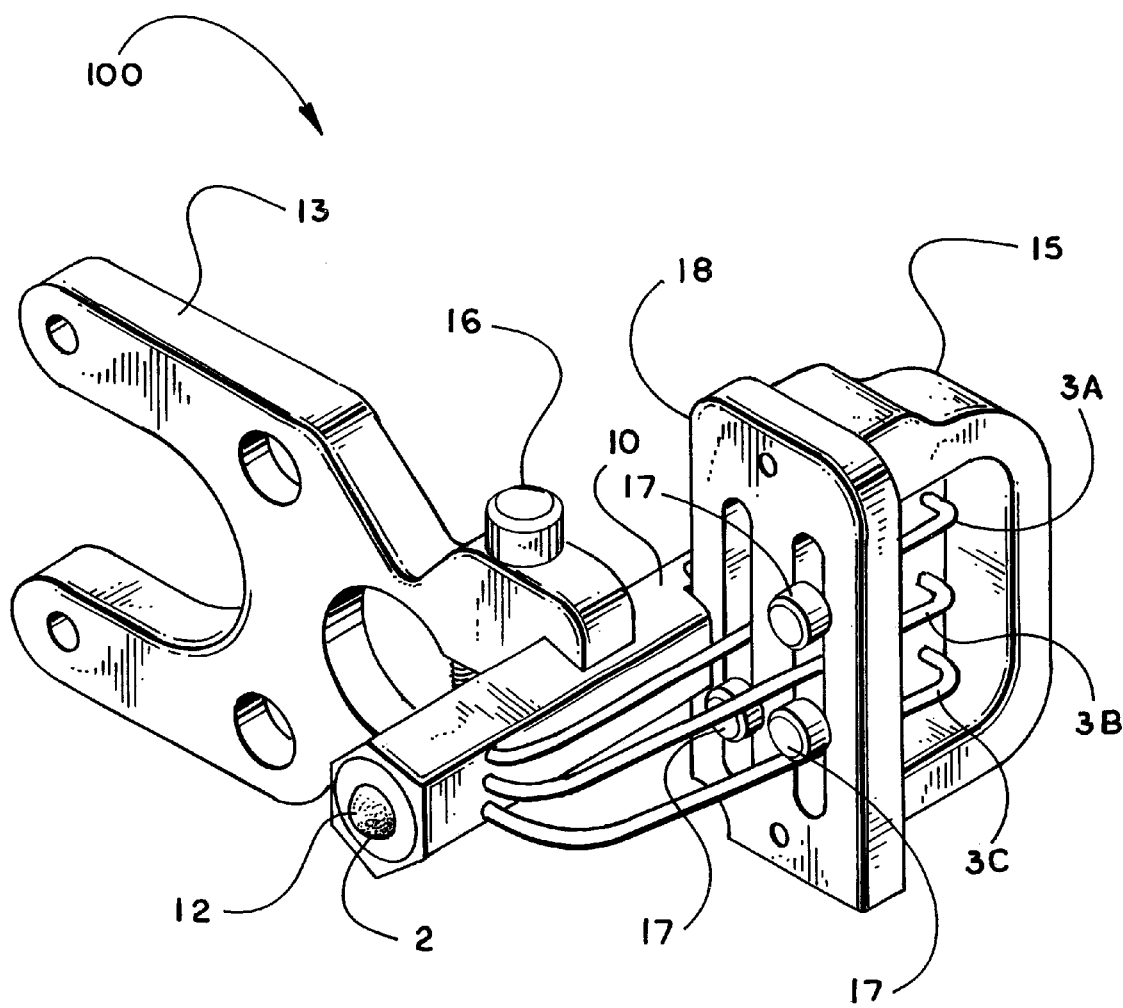
FIG. 1 illustrates a perspective view of an embodiment of a bow sight having an embodiment of a pin illumination system.
Figure 2:
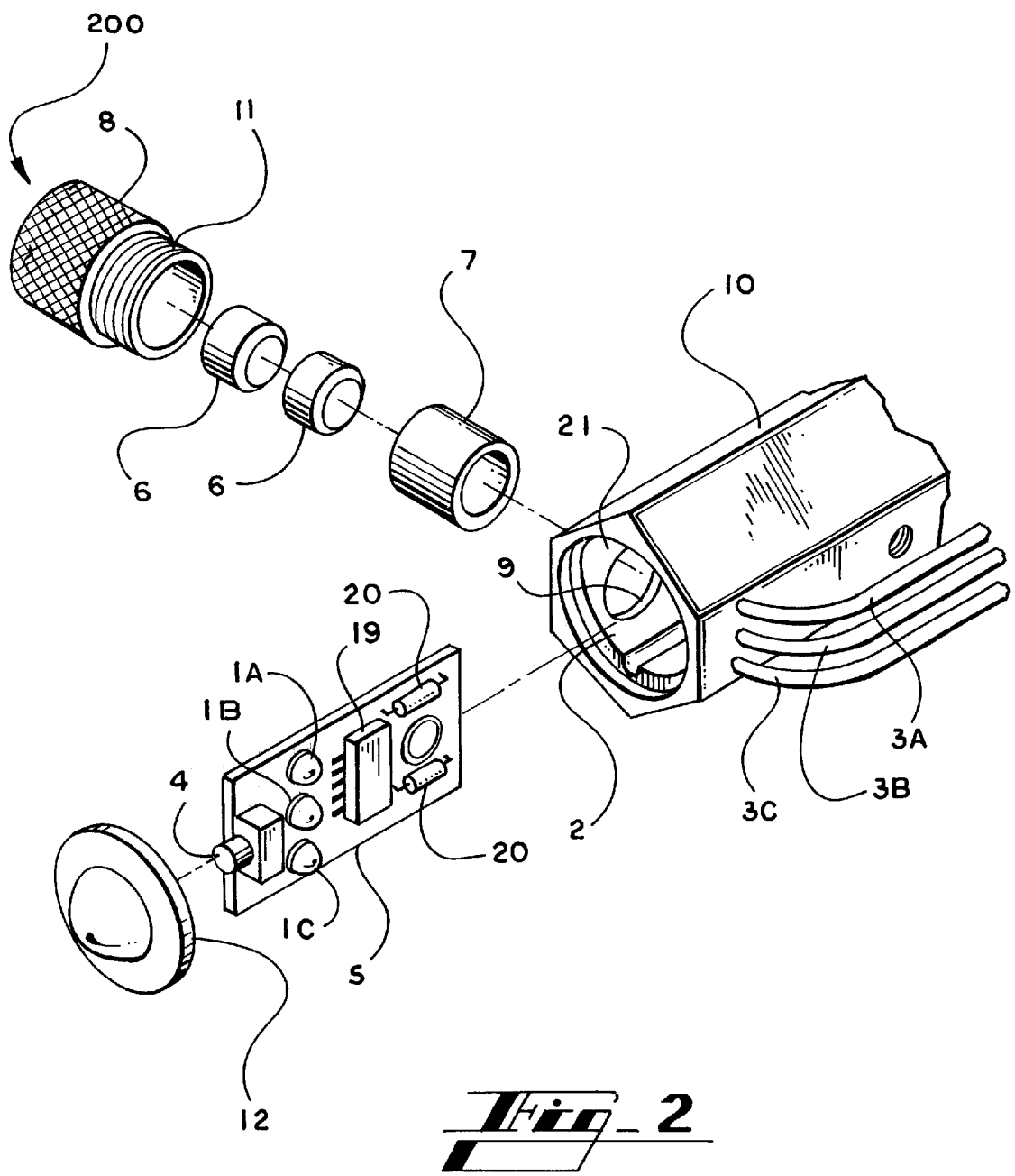
FIG. 2 illustrates an exploded assembly view of an embodiment of electronic circuitry of the bow sight of FIG. 1.

FIG. 1 illustrates a perspective view of an embodiment of a bow sight 100 having an embodiment of a pin illumination system. The bow sight 100 includes a mounting bracket 13 connected to a windage adjustment bar 10. An elastic pad 12 covers a cavity 2 on the end of the bar 10. A set screw 16 enables the bracket 13 to be selectively adjusted with respect to the bar 10. A cross plate 18 is connected to the bar 10 and an arch 15 is connected to the plate 18. Several fiber optic pins 3A, 3B, 3C are connected through the plate 18 and continue into the bar 10. The ends of the fiber optic pins can be bent to act as aiming points. Several set screws 17 can be used to position the fiber optic pins 3A, 3B, 3C on the plate 18. FIG. 2 illustrates an exploded assembly view 200 of an embodiment of electronic circuitry of the bow sight of FIG. 1. A PC board 5 includes a control chip 19 such as a central processing unit or other control integrated circuit and additional control circuitry 20. The PC board acts as the control circuit for the system. The PC board further includes LEDs 1A, 1B, 1C and a switch 4. The PC board 5 can slide into the cavity 2 on the bar 10. When inserted into the cavity 2, the PC board is positioned such that the LEDs 1A, 1B, 1C align with the internal ends of the fiber optic pins 3A, 3B, 3C within the bar 10. As discussed above, the other ends of the pins 3A, 3B 3C are bent to act as aiming points.

The bow sight further includes one or more batteries 6. A battery insulator sleeve 7 slides over the batteries 6 that then fit into a battery housing cap 8. The battery housing cap has a thread 11 that allows it to be screwed into an opening 21 on the side of the bar 10. Once connected, the batteries 6 provide power to the PC board.

An elastic pad 12 can be placed over the PC board housing cavity 22 to seal the PC board 5 including the switch 4. The elastic pad 12 thereby can be used as a push button pad.

FIG. 3 is a front view of an embodiment of a PC board housing cavity 2, within the bar 10, with the elastic pad (12 in FIG. 2) removed, showing the positioning of the LEDs 1A, 1B 1C and the fiber optic pins 3A, 3B, 3C. As described above, when the PC board 5 is positioned within the cavity 2, the LEDs 1A, 1B, 1C align with a respective end of a fiber optic pin 3A, 3B, 3C. FIG. 3 also illustrates the electrical coupling of the batteries 6 with the PC board 5. The battery housing cap 8 provides the coupling.

FIG. 4 illustrates a front view of a bow 400 having the bow sight 100 of FIGS. 1–3.

Bow Sight Operation

Referring still to FIGS. 1–4, operation and use of the selective pin illumination system is now discussed. Prior to operation, the selective pin illumination system is assembled, including sliding PC board 5 into PC board housing cavity 2 of the windage adjustment bar 10 with LEDs 1A, 1B, 1C lined up with the ends of fiber optic pins 3A, 3B, 3C. The opposite ends of the fiber optic pins 3A, 3B, 3C are formed and bent to act as aiming points. The battery insulator sleeve 7 slides over the batteries 6 to be placed in battery housing cap 8, which is then screwed into the windage adjustment bar 10. The elastic material pad 12 is placed over the PC board housing cavity 2 to cover and seal the electronic circuitry underneath and to act as a push button pad.

Once the bow sight 100 is attached to a bow 400, the functions of the selective pin illumination system can be utilized by the archer. The PC board 5 acts to illuminate the LEDs 1A, 1B 1C. The light from the LEDs 1A, 1B, 1C transmits through the fiber optic pins 3A, 3B, 3C and concentrates at the aiming point end. These aiming point ends are typically brightly lit. The PC board can be programmed with a process in such a way that the single switch 4 can be used as a collective on/off switch or as a switch that can individually illuminate one or more of the pins 3A, 3B, 3C. The PC board 5 can also be programmed so that the switch can is be used to adjust the illumination intensity levels of the LEDs 1A, 1B, 1C. For example, one programming sequence can define two pressing types: a long press and a short press. A first long press can illuminate all of the LEDs 1A, 1B, 1C. Another long press can turn off two of the LEDs 1B, 1C, leaving LED 1A illuminated. Another long press can illuminate just LED 1B. A further long press illuminates just LED 1C. Another long press can turn off all the LEDs. In another implementation, using the same programming sequence, one long press can illuminate all the LEDs 1A, 1B, 1C. Then a series of short presses can lower the intensity of the emitted light. A first short press lowers the intensity, a second short press lowers the intensity and a third short press lowers the intensity. Then a fourth short press raises the intensity to the original level. At any point while adjusting the intensity with short presses, long presses can be used to change which LEDs are illuminated. In this way any LED can be lit with any intensity.

The system can be shutoff automatically after an extended period of non-use.

In other programming sequences, the long presses can be used to light one or more of the LEDs 1A, 1B, 1C at a time. In this way one or two of the LEDs 1A, 1B, 1C can be illuminated and adjusted for intensity. It is understood that several programming sequences can be developed from the above description.

In another embodiment, additional switches can be added. For example, one switch can be used to choose LEDs for illumination and the other switch can be used to adjust intensity of illumination.

Three LEDs 1A, 1B, 1C have been shown throughout the above description. It is understood that fewer or more LEDs can be added and positions, intensities and colors can be changed without departing from the spirit of the invention.

The software techniques and methods discussed above can be implemented in digital electronic circuitry, or in computer hardware, firmware (as discussed), software, or in combinations of them. Apparatus may be implemented in a computer program product tangibly embodied in a machine-readable storage device for execution by a programmable processor; and methods may be performed by a programmable processor executing a program of instructions to perform functions by operating on input data and generating output. Further embodiments may advantageously be imple mented in one or more computer programs that are executable on a programmable system including at least one programmable processor coupled to receive data and instructions from, and transmit data and instructions, to a data storage system, at least one input device, and at least one output device. Each computer program may be implemented in a high level procedural or object-oriented programming language, or in assembly or machine language, which can be compiled or interpreted. Suitable processors include, by way of example, both general and special purpose microprocessors. Generally, a processor receives instructions and data from read-only memory and or RAM. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed application specific integrated circuits (ASICs).

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A selective pin illumination system, comprising:

a plurality of elongated fiber optic pins having a first end and a second end;

a control circuit;

a plurality of light emitting elements electrically coupled to the control circuit wherein each of the light emitting elements is optically coupled with a corresponding first end of the elongated fiber optic pin;

a power source connected to the control circuit;

wherein the control circuit includes a process with instructions to selectively illuminate the light emitting elements and selectively adjust the intensity of the light emitting elements;

one or more switches electrically coupled to the control circuit;

wherein the one or more switches are adapted to selectively illuminate the light emitting elements and to selectively adjust the intensity of the light emitting elements;

wherein the process further includes instructions to remove power from the control circuit after an extended period of non-use;

wherein each of the elongated fiber optic pins has an individual color; and wherein the light emitting elements transmit light to each of the fiber optic pins.

2. A bow sight, comprising:

a mounting bracket;

a windage adjustment bar connected to the mounting bracket, the windage adjustment bar having a cavity;

a selective pin illumination system, comprising:

a plurality of elongated fiber optic pins having a first end and a second end, the fibers extending from the cavity to a pin holding bracket connected to the windage adjustment bar;

a control circuit located within the cavity; and a plurality of light emitting elements electrically coupled to the control circuit wherein each of the light emitting elements is optically coupled with a corresponding first end of the elongated fiber optic pin within the cavity.

3. The bow sight as claimed in claim 2 further comprising a switch electrically coupled to the control circuit, the switch protruding from the cavity.

4. The bow sight as claimed in claim 3 further comprising an elastic push button cover mechanically coupled to the switch and covering the cavity.

5. The bow sight as claimed in claim 3 further comprising at least one battery electrically coupled to the control circuit.

6. The bow sight as claimed in claim 5 further comprising a battery housing cap enclosing the at least one battery and connected to the windage adjustment bar.

7. The bow sight as claimed in claim 2, wherein the second ends of the plurality of elongated fiber optic pins emit light within the pin holding bracket.

8. The bow sight as claimed in claim 7, wherein the second ends of the plurality of elongated fiber optic pins are adapted to be adjusted as aiming points.

9. The bow sight as claimed in claim 8 further comprising a set screw for each of the plurality of elongated fiber optic pins.

10. A bow, comprising:

a bow shaft;

a bow string connected to the bow shaft;

a bow sight connected to the bow shaft, the bow sight including:

a mounting bracket;

a windage adjustment bar connected to the mounting bracket, the windage adjustment bar having a cavity;

a selective pin illumination system, comprising:

a plurality of elongated fiber optic pins having a first end and a second end, the fibers extending from the cavity to a pin holding bracket connected to the windage adjustment bar;

a control circuit located within the cavity; and a plurality of light emitting elements electrically coupled to the control circuit wherein each of the light emitting elements is optically coupled with a corresponding first end of elongated fiber optic pin within the cavity.

* * * * *